(12) United States Patent
Giersch et al.

(10) Patent No.: US 12,334,602 B2
(45) Date of Patent: Jun. 17, 2025

(54) METHOD FOR MANUFACTURING A DIAPHRAGM-ELECTRODE ARRANGEMENT INCLUDING A SEAL

(71) Applicant: Robert Bosch GmbH, Stuttgart (DE)

(72) Inventors: Dominik Giersch, Eberdingen (DE); Egon Moosbrugger, Stuttgart (DE); Joachim Strauch, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 130 days.

(21) Appl. No.: 17/649,845

(22) Filed: Feb. 3, 2022

(65) Prior Publication Data

US 2022/0255091 A1    Aug. 11, 2022

(30) Foreign Application Priority Data

Feb. 11, 2021 (DE) ................ 10 2021 201 298.1

(51) Int. Cl.
*H01M 8/0271* (2016.01)
*B29C 45/16* (2006.01)
*H01M 8/1004* (2016.01)

(52) U.S. Cl.
CPC ........... *H01M 8/0271* (2013.01); *B29C 45/16* (2013.01); *H01M 8/1004* (2013.01)

(58) Field of Classification Search
CPC ...................................................... H01M 4/88
See application file for complete search history.

(56) References Cited

U.S. PATENT DOCUMENTS

| 2001/0019790 A1* | 9/2001 | Regan | .......... C07F 5/025 |
| | | | 29/623.2 |
| 2005/0255372 A1* | 11/2005 | Lertola | ............ H01M 8/242 |
| | | | 429/534 |
| 2014/0004442 A1* | 1/2014 | Mitsuta | ........... H01M 8/0273 |
| | | | 429/481 |

FOREIGN PATENT DOCUMENTS

| JP | 2013062031 A | 4/2013 |
| JP | 2016024937 A | 2/2016 |

* cited by examiner

*Primary Examiner* — Haroon S. Sheikh
(74) *Attorney, Agent, or Firm* — NORTON ROSE FULBRIGHT US LLP

(57) ABSTRACT

A method for manufacturing a diaphragm-electrode arrangement including seal from at least one layer material and an electrode material. A diaphragm-electrode arrangement made of an electrode material and at least one layer material is provided either from a common roll store or as a layer assemblage from individual rolls. The electrode material is connected to the at least one layer material by an injection molding process. Cavities and edge areas in the at least one layer material are filled up by the injection molding material and form a seal of the band-shaped diaphragm-electrode arrangement. The injection molding material, in particular TPE, is used in the following stacking process as a seal between the electrodes.

6 Claims, 5 Drawing Sheets

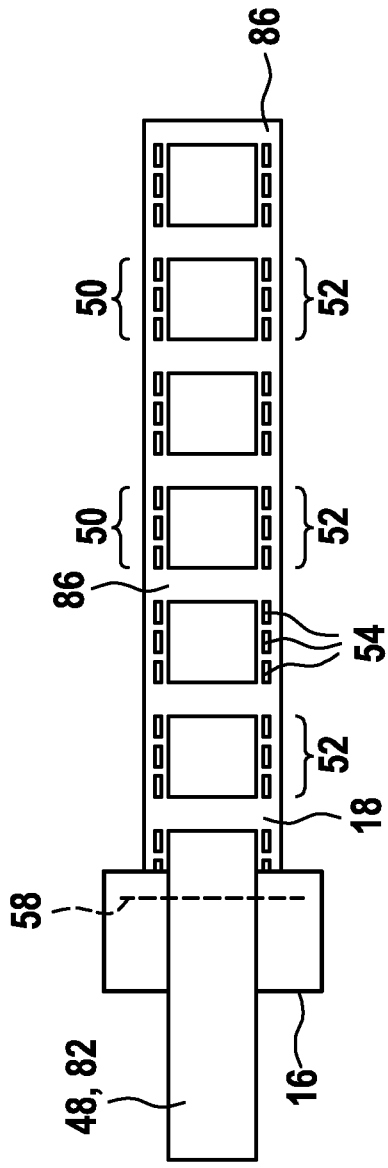
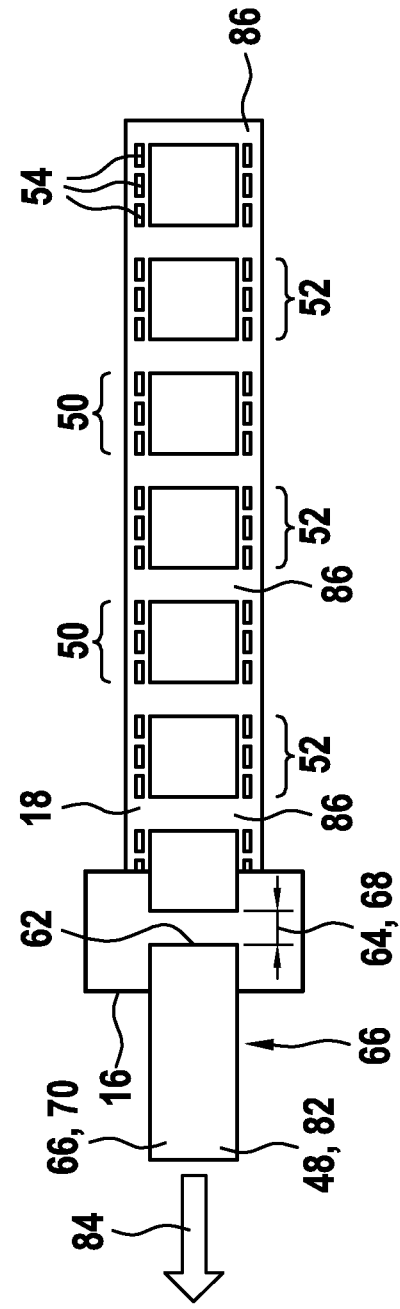

METHOD FOR MANUFACTURING A DIAPHRAGM-ELECTRODE ARRANGEMENT INCLUDING A SEAL

CROSS REFERENCE

The present application claims the benefit under 35 U.S.C. § 119 of German Patent Application No. DE 10 2021 201 298.1 filed on Feb. 11, 2021, which is expressly incorporated herein by reference in its entirety.

FIELD

The present invention relates to a method for manufacturing a diaphragm-electrode arrangement including a seal made of at least one layer material and one electrode material. Furthermore, the present invention relates to the use of the method for manufacturing a diaphragm-electrode arrangement including a seal of a fuel cell stack of a fuel cell for the drive of an electric vehicle.

BACKGROUND INFORMATION

The present invention is directed to the manufacturing and use of alternative drives for the mobility of the future. In addition to battery-operated electric vehicles, vehicles operated with the aid of a fuel cell are also playing an increasingly greater role. Present fuel cell vehicles are only manufactured in small lots, due to which the assembly and the concepts for ensuring the leak-tightness of the fuel cell or its components are not suitable for mass production. Bipolar plates typically used in fuel cell stacks are usually provided with elastomer seals, which are then pressed against one another during the assembly of a fuel cell stack from a number of bipolar plates.

Applying seals made of elastomer material and dispensing, for example, silicone sealing beads is very time-consuming and only has limited suitability for mass production. A further approach from the present development is, for example, adhesively bonding individual stages of a fuel cell stack on one another. However, this approach has the disadvantage of the circumstance that recycling and separation of individual components of these individual stages may only be provided with great effort.

SUMMARY

The present invention relates to a method for manufacturing a diaphragm-electrode arrangement including a seal made of at least one layer material and one electrode material. In accordance with an example embodiment of the present invention, the method includes the following steps:
a) providing a band-shaped diaphragm-electrode arrangement made of an electrode material and at least one layer material either from a common roll supply or as a layer assemblage of individual rolls,
b) entering the band-shaped diaphragm-electrode arrangement provided according to a) into an injection molding unit,
c) connecting the electrode material to the at least one layer material by an injection molding process,
d) filling up cavities and edge areas in the at least one layer material in the injection molding process using injection molding material to create a seal of a section to be severed of the diaphragm-electrode arrangement.

A production process for the mass-suitable manufacturing of diaphragm-electrode arrangements may advantageously be implemented by the method provided according to the example embodiment of the present invention present invention while representing embedding in at least one seal material. The processing may advantageously take place from roll to roll, since in the case of large lots, roll to roll manufacturing enables a very efficient production process.

In one advantageous refinement of the method provided according to the present invention, according to b), the diaphragm-electrode arrangement is drawn into the injection molding unit and a diaphragm-electrode arrangement section is severed at a cutting edge. This discrete diaphragm-electrode arrangement section is enveloped in the injection molding unit using the injection molding material in combination with a stamping and injection molding process; furthermore, stamping processes may be carried out in parallel. In one advantageous refinement of the method provided according to the present invention, after the severing of the diaphragm-electrode arrangement section, the leading end of the band-shaped diaphragm-electrode arrangement is retracted and an interspace is created between it and the severed diaphragm-electrode arrangement section. A separate extrusion coating of the discrete section severed from the band-shaped diaphragm-electrode arrangement may thus advantageously be carried out in the injection molding unit.

In one advantageous refinement of the method provided according to the present invention, after the injection molding unit is closed, extrusion coating of the previously severed diaphragm-electrode arrangement section accommodated therein is carried out.

In one particularly advantageous refinement of the approach provided according to the present invention, a connection made of injection molding material to the previously severed diaphragm-electrode arrangement section is created by the extrusion coating of the severed diaphragm-electrode arrangement section. In the method provided according to the present invention, initially a diaphragm-electrode arrangement is supplied in band form on a roll. This band-shaped supply of the diaphragm-electrode arrangement contains neither sealing elements nor connecting elements at this point in time. At the end of the method, there is a method product in the form of a band, which is made up of multiple diaphragm-electrode arrangement sections, which are in turn connected to sealing or connecting elements and are again stockpiled in roll form as an endless material and as the final product. This is achieved by entering the diaphragm-electrode arrangement roll starting material into an injection molding machine, severing a diaphragm-electrode arrangement section, subsequently conveying the band-shaped starting material back to achieve a distance between two severed diaphragm-electrode arrangement sections, into which the seal material is in turn injected. The previously severed diaphragm-electrode arrangement section is thus again connected to the band-shaped starting roll material. A connection to the particular diaphragm-electrode arrangement section severed in the preceding step is thus provided.

In another advantageous embodiment of the method provided according to the present invention, at least one gas-conveying first duct system made of individual ducts is created by a stamping and cutting process in the extrusion coated injection molding material. The duct system, which is located in the edge areas of the diaphragm-electrode arrangement band, includes ducts which are used for the media supply or media removal of a fuel cell in later use. In the described method according to the present invention, these passages are created directly within the injection molding process by the use of a tool insert integrated into the injection molding tool. The required duct system including its ducts thus advantageously does not have to be manufactured in a separate and downstream process step.

In an alternative variant of the method provided according to the present invention for manufacturing a diaphragm-electrode arrangement including a seal, in an injection molding unit, a pre-laminated structure is supplied as roll material into the injection molding machine (accordingly replaces the diaphragm-electrode arrangement roll material in the above-described process, the actual process control does not change in this alternative, rather solely the supplied roll material). The pre-laminated structure is in particular pre-laminated with a polyethylene naphthalate. An extrusion coating, which seals the pre-laminated structure, made of injection molding material is created in an injection molding unit by a sealing extrusion coating made of injection molding material.

The present invention furthermore relates to the use of the method for manufacturing a diaphragm-electrode arrangement including a seal in a fuel cell stack of a fuel cell for the drive of an electric vehicle.

An advantageous method for manufacturing an endless diaphragm-electrode arrangement including a seal for improving the handling and mass production is represented by the approach provided according to the present invention. Much more efficient material processing in comparison to the manufacture previously requiring a large number of manual operations in small series and thus process control which may be automated may be achieved. The method provided according to the present invention permits processing from roll to roll, since in the case of large lots, roll to roll manufacturing enables a very efficient manufacturing process. The starting materials are either taken as a pre-laminated structure from a roll supply or, in the case of receiving the starting materials on individual rolls prior to processing inside the injection molding unit, are combined to form a layer assemblage, which is transferred in toto in the feed direction into the injection molding unit. A method is provided according to the present invention in which a stamping process may be brought together with an injection molding process.

The significant advantages of the method provided according to the example embodiment of the present invention may be seen in an efficiency increase of the manufacturing process and a significant cost savings linked thereto in comparison to conventionally used processes. The sealing material, using which cavities and edge areas of the layer of the at least one layer material are filled up, may be applied automatically. The spraying of the extrusion coating made of injection molding material onto the severed sections of the band-shaped supplied diaphragm-electrode arrangement enables the formation of a very thin layer, since these materials may be penetrated accordingly, which is extremely effective for the seal, i.e., for filling up cavities and edge areas. An in-line roll to roll process may be provided, which permits a simple process control and enables the product obtained to be received on a roll stockpile.

Furthermore, a meandering Z stack formation may also be provided for depositing the obtained product if corresponding folds are formed. In the method provided according to the present invention, a creation of a duct system including a number of duct vias is particularly advantageously integrated into the injection molding process. This may be achieved by a stamping unit integrated into an automatic injection molding system and an injection molding machine, so that a downstream process step otherwise required after the injection molding process, which is saved by the method provided according to the present invention, may be omitted, since the stamping of the duct system may be carried out, for example, during or shortly after the injection molding process in the injection molding unit.

BRIEF DESCRIPTION OF THE DRAWINGS

The present invention is explained hereinafter on the basis of the figures.

FIG. 7 shows a stamping or cutting process, which takes place inside the injection molding unit, in accordance with an example embodiment of the present invention.

FIG. 8 shows a reverse conveyance of the band-shaped material against the feed direction, in accordance with an example embodiment of the present invention.

DETAILED DESCRIPTION OF EXAMPLE EMBODIMENTS

Figure 1:
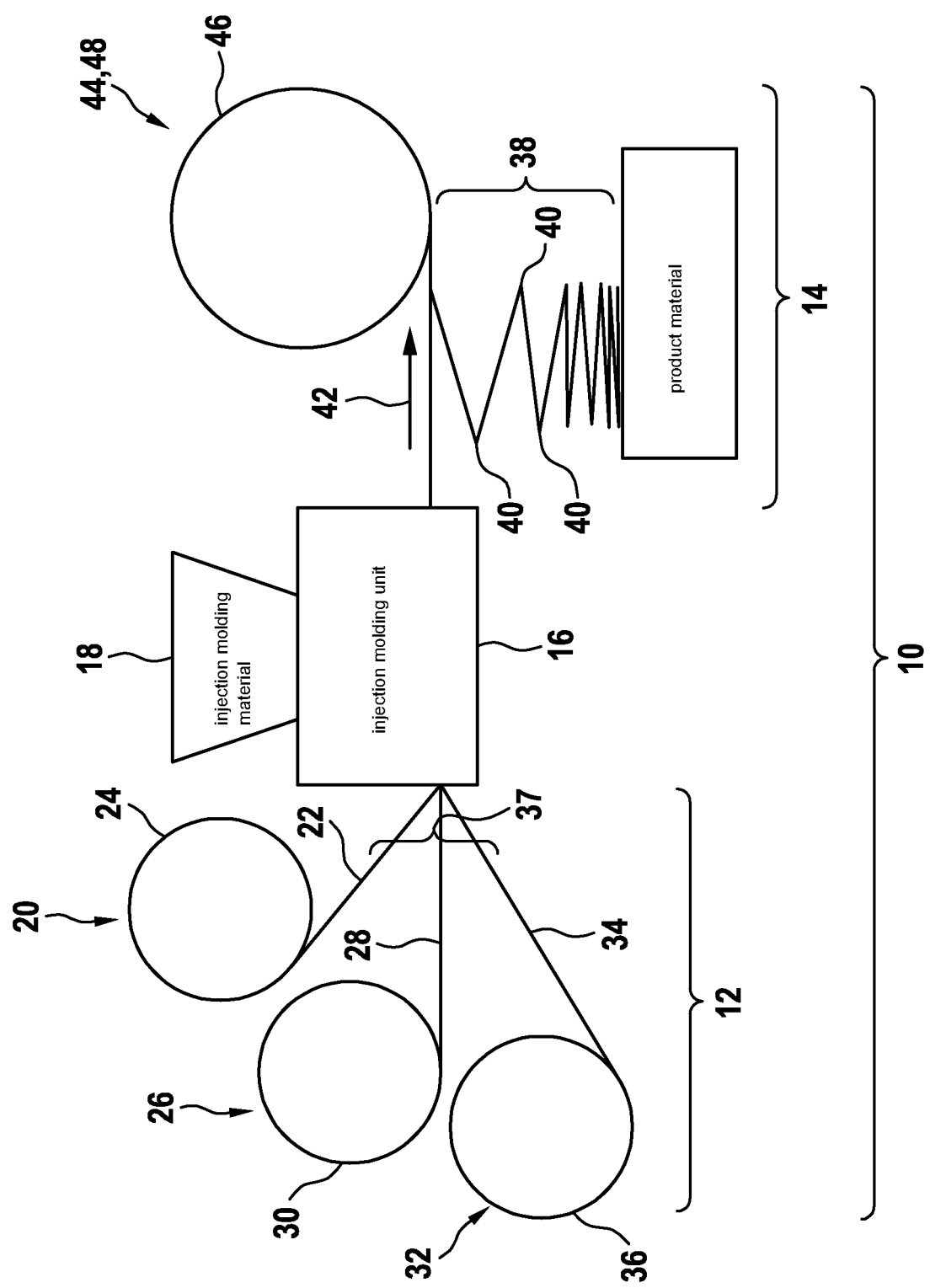
FIG. 1 shows a schematic representation of a manufacturing unit for manufacturing a diaphragm-electrode arrangement including a seal, in accordance with an example embodiment of the present invention.

In the following description of the specific embodiments of the present invention, identical or similar elements are identified by identical reference numerals, a repeated description of these elements being omitted in individual cases. The figures only schematically represent the subject matter of the present invention.

The illustration according to FIG. 1 shows a manufacturing unit 10 for manufacturing a diaphragm-electrode arrangement 48 according to the present invention including a seal.

FIG. 1 shows a manufacturing unit 10, in which a product material 14 is manufactured from starting materials 12. Manufacturing unit 10 includes an injection molding unit 16, within which a stamping or cutting process 58 and injection molding process 60 take place. An injection molding material 18, for example, a thermoplastic or an elastomer, is processed inside injection molding unit 16.

A first layer material 20, which may be, for example, a first gas diffusion layer 22, is provided as starting materials 12 in the schematic illustration according to FIG. 1. First layer material 20 is accommodated, for example, on a first individual roll 24. A band-shaped electrode material 26, for example, in the form of a thin electrode film 28, is accommodated on a second individual roll 30. Furthermore, according to the illustration in FIG. 1, a second layer material 32, which may be, for example, a second gas diffusion layer 34, is accommodated on a third individual roll 36. A layer assemblage 37 made of thin layers, which is supplied in feed direction 42 to injection molding unit 16, is formed from these materials, i.e., from first layer material 20, electrode material 26, and second layer material 32.

Alternatively to the illustration according to FIG. 1, first layer material 20, electrode material 26, and second layer material 32 may be accommodated on a common roll stockpile 80 (cf. FIG. 3) and supplied as an already pre-fabricated layer assemblage 37 to injection molding unit 16 in feed direction 42.

Layer assemblage 37 is extrusion coated using injection molding material 18 inside injection molding unit 16. Injection molding material 18 is, for example, a thermoplastic or an elastomer material and the like. After the formation of the extrusion coating of layer assemblage 37 inside injection molding unit 16, product material 14, which leaves injection molding unit 16 in feed direction 42, is provided, for example, with a fold 40, so that individual sections of product material 14 may be situated in the form of a stack 38 (meandering stack). Alternatively, there is the option—as schematically shown in FIG. 1—of rolling a product stockpile 44 of product material 14, which leaves injection molding unit 16, onto a product roll 46.

Figure 2:
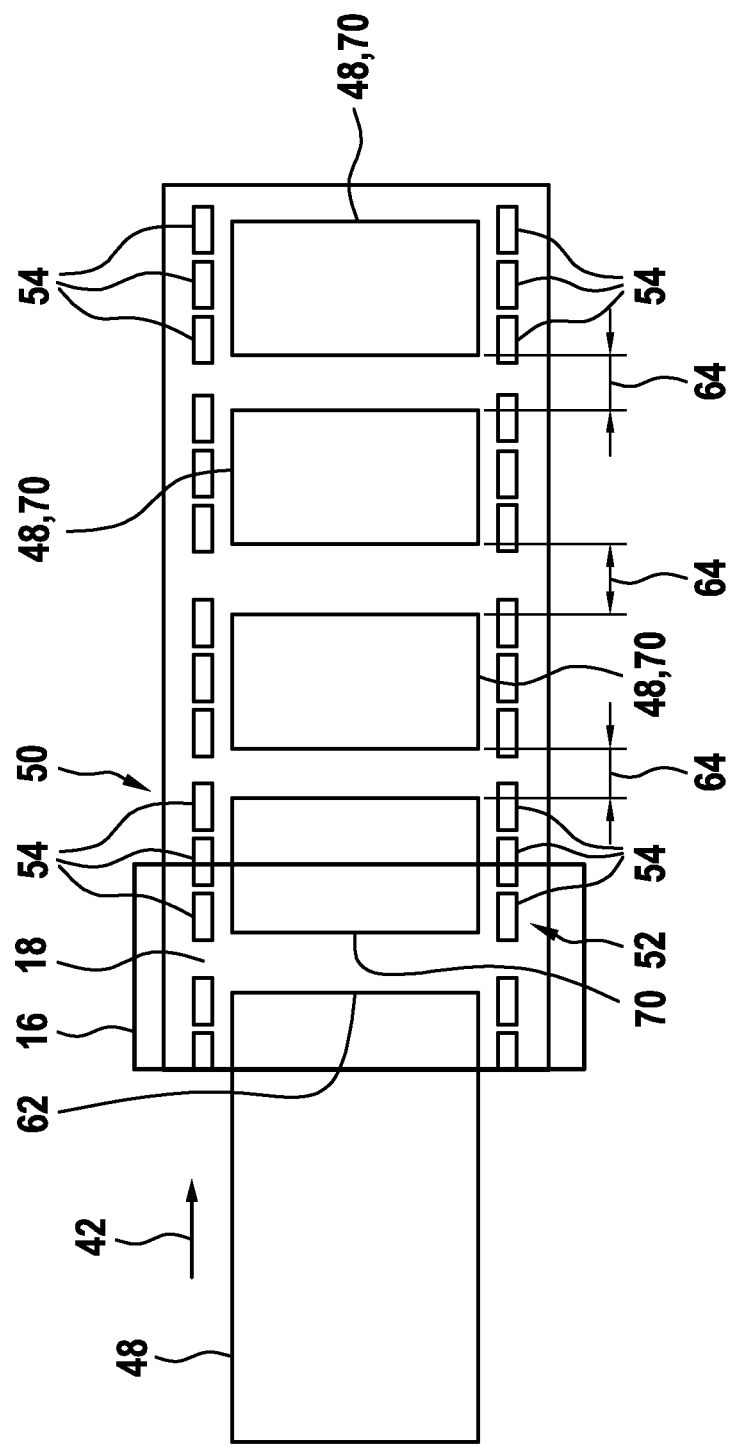
FIG. 2 shows details of the manufacturing process including a diaphragm-electrode arrangement supplied in band form and its extrusion coating by an injection molding material inside the injection molding unit, in accordance with an example embodiment of the present invention.

The illustration of FIG. 2 shows details of the manufacturing method provided according to the present invention. Reference is made to the above-described components of manufacturing unit 10, as were described in conjunction with FIG. 1, in the explanation of FIG. 2.

A diaphragm-electrode arrangement 48 is supplied as a band-shaped material to injection molding unit 16. Diaphragm-electrode arrangement 48 is layer assemblage 37, provided as explained in conjunction with FIG. 1. In addition to injection molding process 60, a stamping or cutting process 58 takes place inside injection molding unit 16. A diaphragm-electrode arrangement section 70 is severed at a cutting edge 62 from diaphragm-electrode arrangement 48 provided in band form. An interspace 64 is created between severed diaphragm-electrode arrangement section 70 and cutting edge 62 of band-shaped diaphragm-electrode arrangement 48.

The extrusion coating of severed diaphragm-electrode arrangement 70 using injection molding material 18 and creating first gas-conveying duct system 50 and possibly a second gas-conveying duct system 52, each including a number of individual ducts 54, with the aid of a stamping or cutting process 58 take place inside injection molding unit 16. After formation of gas-conveying duct systems 50, 52 at the end faces of particular severed diaphragm-electrode section 70, a connection is reestablished 68 between previously severed diaphragm-electrode arrangement sections 70. Reestablishing 68 a connection between previously severed diaphragm-electrode arrangement 70 and the band-shaped material of diaphragm-electrode arrangement 48 is carried out since this material contains many very expensive components, for example noble metals, particularly platinum. To utilize these in the best possible manner, this material is only used in an active area, while this material is not to be used in the area of the media inlet of the duct guides for reasons of efficiency. It is therefore necessary to create interspace 64 between severed diaphragm-electrode arrangement section 70 and the leading end of the band-shaped material. The severing is carried out by stamping and cutting process 58; by way of subsequent reverse conveyance and an injection molding process 60 carried out again in interspace 64, the two ends, i.e., cut edge 62 of diaphragm-electrode arrangement 70 and the leading end of the band-shaped material, are connected to one another again (cf. in particular the illustration according to FIG. 8).

After a connection is reestablished 68 between extrusion coated severed diaphragm-electrode arrangement sections 70 and particular preceding severed diaphragm-electrode arrangement section 70, a continuous product stockpile 44 results, as schematically shown in FIG. 2, also provided in band form, which may possibly be rolled onto product roll 46 shown in FIG. 1. Alternatively to rolling endless product material 14 onto the circumference of product roll 46, there is the option of creating individual sections in band-shaped product material 14 by folds 40, which may subsequently be deposited as a stack 38 in the form of a meandering stack, as schematically indicated in FIG. 1.

Alternatively to the above-described embodiment variant of the method provided according to the present invention, the manufacturing of a diaphragm-electrode arrangement 48 including a seal by injection molding material 18 may be achieved in that an already pre-laminated structure 82, which is in particular pre-laminated with a polyethylene naphthalate layer, is created. For the case in which a pre-laminated structure 82 is accommodated on a product roll 46, two of the rolls shown in FIG. 1 or 4 may be omitted. An extrusion coating made of injection molding material 18, which seals pre-laminated structure 82, is created in an injection molding unit 16 by a sealing extrusion coating made of injection molding material 18.

Furthermore, the present invention relates to the use of the method for manufacturing a diaphragm-electrode arrangement 48 including a seal and to the use of the method for manufacturing a diaphragm-electrode arrangement 48 including a seal.

Figure 3:
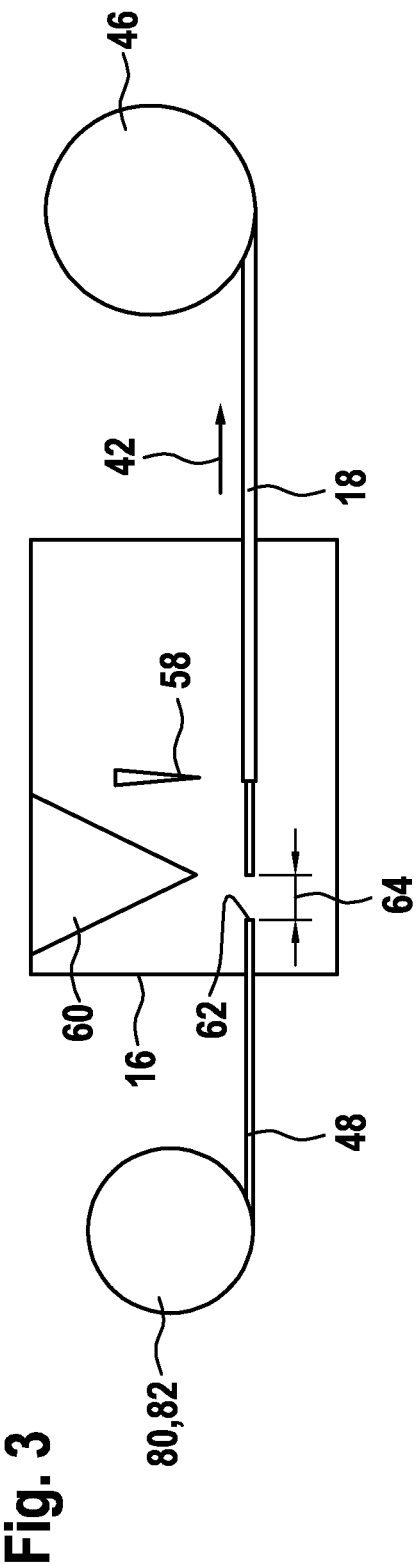
FIG. 3 shows a pre-fabricated, pre-laminated structure as a roll product for supply to an injection molding unit, in accordance with an example embodiment of the present invention.

FIG. 3 shows pre-laminated structure 82, which is accommodated on a coil as a roll stockpile 80. Pre-laminated structure 82 is supplied to injection molding unit 16, in which injection molding process 60 takes place and also a stamping or cutting process 58 is carried out. Initially, an extrusion coating made of injection molding material 18 is created in injection molding unit 60 in pre-laminated structure 82, before—viewed in feed direction 42—severing of a diaphragm-electrode arrangement section 70 from the progressing band stockpile occurs. After a connection is established 68 between severed diaphragm-electrode arrangement section 70 by a movement of pre-laminated structure 82 in reverse conveyance direction 84, the obtained composite is rolled onto product roll 46, which takes place continuously.

Figure 4:
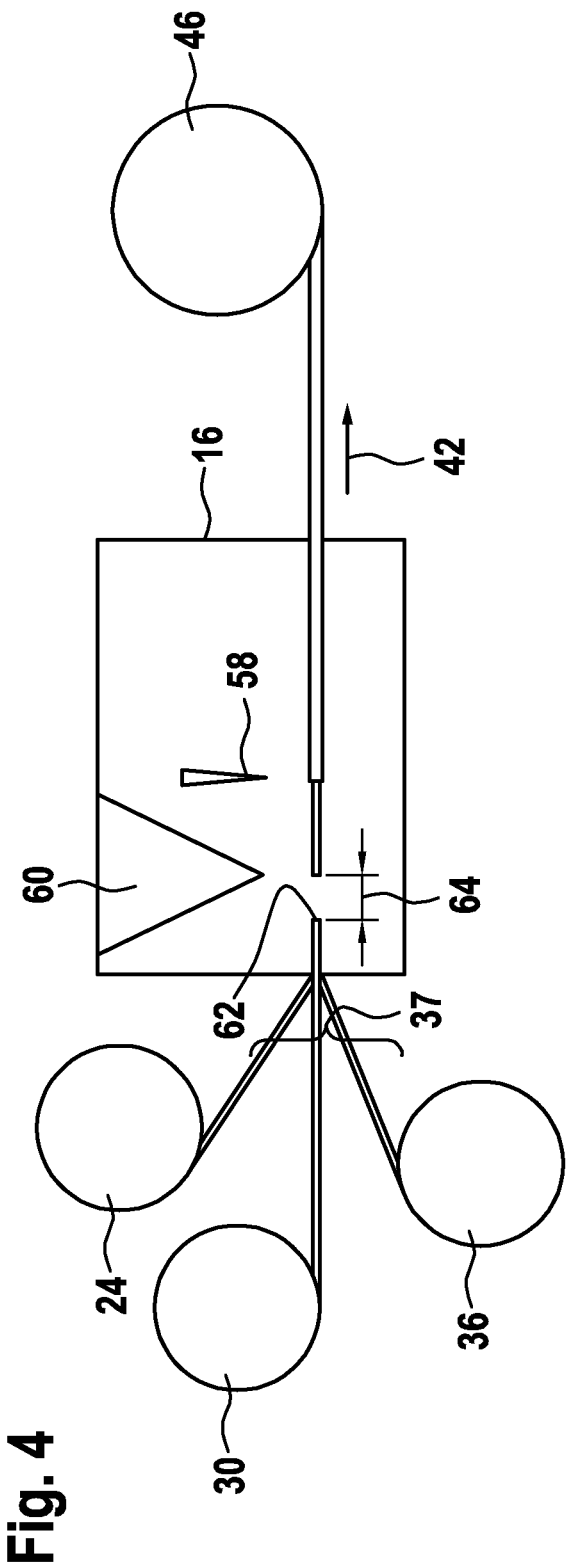
FIG. 4 shows an arrangement of multiple individual rolls, from the band-shaped stores of which a layer assemblage results, which is supplied to the injection molding unit, in accordance with an example embodiment of the present invention.

It is apparent from the illustration according to FIG. 4 that various materials are accommodated on first individual roll 24, second individual roll 30, and third individual roll 36, similarly to the illustration according to FIG. 1, which are joined together to form a layer assemblage 37 during a continuous conveyance of the band-shaped materials. Layer assemblage 37 combined from the various materials is continuously supplied to injection molding unit 16.

An injection molding process 60 and a stamping or cutting process 58 are carried out in one work step inside injection molding unit 16. At a cutting edge 62, a diaphragm-electrode arrangement section 70 is severed, resulting in an interspace 64 between it and cutting edge 62. Interspace is identified by reference numeral 64.

As also shown in the illustration in FIG. 4, layer assemblage 37 is enclosed using a plastic extrusion coating made of injection molding material 18 by injection molding process 60, which takes place inside injection molding unit 16. After a connection is reestablished 68 between severed diaphragm-electrode arrangement section 70 and cutting edge 62, the obtained band-shaped material is rolled back onto product roll 46 in feed direction 42, similarly to the illustration according to FIG. 1.

The individual method steps for manufacturing a diaphragm-electrode arrangement 48 including a seal may be seen in detail in the figure sequence of FIGS. 5 through 8.

Figure 5:
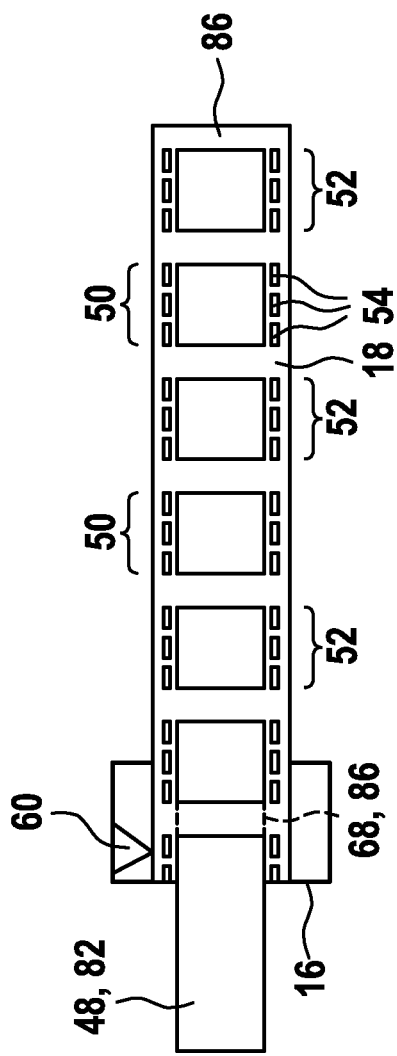
FIG. 5 shows a schematic representation of the injection molding, in accordance with an example embodiment of the present invention.
Figure 6:
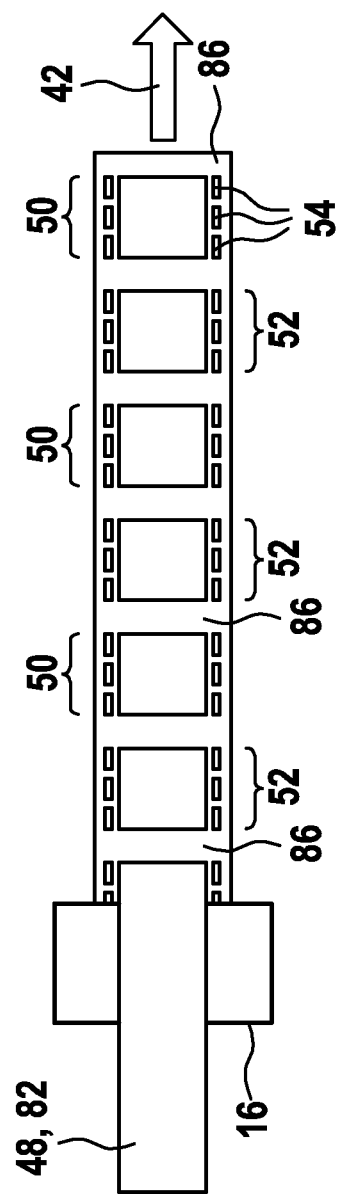
FIG. 6 shows a further conveyance of the band-shaped material in the feed direction, in accordance with an example embodiment of the present invention.

FIG. 5 shows how the band-shaped material of a diaphragm-electrode arrangement (DEA) 48 or alternatively a pre-laminated structure 82 is supplied to injection molding unit 16. Injection molding process 60, in which the band-shaped materials are extrusion coated using injection molding material 18, takes place inside injection molding unit 16 (cf. illustration according to FIGS. 3 and 4). Band-shaped product stockpile 44, either diaphragm-electrode arrangement 48 or pre-laminated structure 82, is then moved in feed direction 42, as shown in FIG. 6. It is apparent from the illustrations according to FIGS. 5 and 6, that during or after injection molding process 60, which takes place inside injection molding unit 16, first gas-conveying duct systems 50 or second gas-conveying duct systems 52, each including a number of individual ducts 54, are formed in the plastic extrusion coating of band-shaped diaphragm-electrode arrangement 48 or band-shaped pre-laminated structure 82, in the edge areas in each case. Individual ducts 54 of said first gas-conveying duct system 50 and second gas-conveying duct system 52 are manufactured in one work step, so that a separate postprocessing process for manufacturing individual ducts 54 may be saved.

It is apparent from the illustration according to FIG. 7 that a stamping and cutting process 58 is carried out inside injection molding unit 16, in which a severed diaphragm-electrode arrangement section 70 results.

It is apparent from FIG. 8 that severed diaphragm-electrode arrangement section 70 is conveyed in reverse conveyance direction 84, so that an interspace 64 results between its cut edge 62 and the end of band material 48, 82 including a plastic extrusion coating 86 made of injection molding material 18. In the method according to the present invention, the inactive area of relatively expensive band-shaped material 48, 82 is effectively utilized. It is apparent from the figure sequence of FIGS. 5 through 8 that according to FIG. 5, the connection is reestablished 68 from roll to roll during injection molding process 60 in interspace 64 between severed diaphragm-electrode arrangement section 70 and the leading end of band-shaped material 48, 82. According to FIG. 6, band-shaped material 48, 82 is conveyed further, since both roll stockpiles are connected to one another. In FIG. 7, stamping and cutting process 58 is carried out in injection molding unit 16. FIG. 8 shows a reverse conveyance in reverse conveyance direction 84 to create interspace 64 and subsequently a connection is reestablished 68 between the previously severed components by injection molding process 60, i.e., a reestablishment 68 of a continuous band-shaped material 48, 82.

The present invention is not restricted to the exemplary embodiments described here and the aspects highlighted therein. Rather, a variety of modifications are possible within the scope of the present invention, which are routine measures for those skilled in the art, in view of the disclosure herein.

What is claimed is:

1. A method for manufacturing a diaphragm-electrode arrangement including a seal made of at least one layer material and an electrode material, the method comprising the following steps:
   a) providing a band-shaped diaphragm-electrode arrangement made of an electrode material and at least one layer material either from a common roll stockpile or as a layer assemblage of individual rolls;
   b) entering the band-shaped diaphragm-electrode arrangement provided according to step a) into an injection molding unit;
   c) connecting the electrode material to the at least one layer material by an injection molding process; and
   d) filling up cavities and edge areas in the at least one layer material in the injection molding process using injection molding material to create a seal of a section to be severed of the diaphragm-electrode arrangement, wherein:
   in step b), the band-shaped diaphragm-electrode arrangement is entered into the injection molding unit and a diaphragm-electrode arrangement section is severed at a cut edge,
   after the severing of the diaphragm-electrode arrangement section, the band-shaped diaphragm-electrode arrangement is retracted and an interspace is created between the band-shaped diaphragm-electrode arrangement and the severed diaphragm-electrode arrangement section, and
   after the interspace is created, reestablishing in the injection molding unit a connection between the previously severed diaphragm-electrode arrangement section and the band-shaped diaphragm-electrode arrangement by applying the injection molding material to the previously severed diaphragm-electrode arrangement and the band-shaped diaphragm-electrode arrangement, the connection being reestablished while maintaining the interspace.

2. The method as recited in claim 1, wherein after the injection molding unit is closed, the severed diaphragm-electrode arrangement section is extrusion coated with the injection molding material.

3. The method as recited in claim 2, wherein a connection made of the injection molding material to the preceding severed diaphragm-electrode arrangement section is created by the extrusion coating of the severed diaphragm-electrode arrangement section.

4. The method as recited in claim 1, wherein the cut edge in the band-shaped diaphragm-electrode arrangement is located between two sequentially successive diaphragm-electrode units.

5. The method as recited in claim 1, wherein at least one gas-conveying first duct system made of individual ducts is created in the injection molding material by introducing inserts inside the injection molding unit.

6. The method as recited in claim 1, wherein the diaphragm-electrode arrangement is for a fuel cell stack of a fuel cell for a drive of an electric vehicle.

* * * * *